Nov. 28, 1961 — C. O. BAKER ET AL — 3,010,537
MIST EXTRACTOR

Filed Dec. 14, 1959 — 2 Sheets-Sheet 1

CHARLES OVID BAKER
FRANK R. SCAUZILLO
INVENTORS

BY H. Mathews Garland
ATTORNEY

Nov. 28, 1961    C. O. BAKER ET AL    3,010,537
MIST EXTRACTOR

Filed Dec. 14, 1959    2 Sheets-Sheet 2

CHARLES OVID BAKER
FRANK R. SCAUZILLO
INVENTORS

BY H. Mathews Garland
ATTORNEY

United States Patent Office 3,010,537
Patented Nov. 28, 1961

3,010,537
MIST EXTRACTOR
Charles Ovid Baker, Garland, and Frank R. Scauzillo, Dallas, Tex., assignors to Socony Mobil Oil Company, Inc., a corporation of New York
Filed Dec. 14, 1959, Ser. No. 859,178
2 Claims. (Cl. 183—34)

This invention relates to the separation of liquids and gases and relates more particularly to an apparatus adapted to remove liquid particles in the form of entrained mist from gas.

The problem of extracting entrained mist from gas is common to many processes which are found in various industries, such as the petroleum industry and the chemical industry. Among the apparatus employed in such industries are absorbers, fractionators, vacuum stills, flashers, strippers, and others. It is also common practice to use various types of compressors which present problems of mist removal due to the fact that lubricant droplets become entrained into the compressed medium, resulting in both the loss of the lubricants and the presence of unwanted materials in the compressed medium. The entrained mist found in gases flowing in these various types of apparatus varies in particle size upwardly from a minimum in the submicron range. The particle size frequently is less than 7 microns in diameter.

It is an object of this invention to provide liquid-gas separation apparatus. It is another object of this invention to provide apparatus for the removal of entrained mist particles from a stream of flowing gas. These and further objects of the invention will be evident from the following detailed description of the invention in conjunction with the accompanying drawings.

In accordance with the invention, there is provided an enclosed pressure vessel having inlet means and outlet means. In association with the inlet means are means for inducing centrifugal separation of the largest entrained liquid particles from a stream of flowing gas. Downstream from the inlet means is a first filter means for removal of liquid particles within a stated size range. Downstream from the first filter means the vessel is provided with a baffle separating the vessel into two compartments or chambers. Secured through the baffle are one or more agglomerating tube assemblies which provide an exclusive flow path for gas and entrained liquid particles. The agglomerating tube assemblies coalesce small liquid particles into larger particles which are in turn separated from the gas by a second filter unit positioned in the vessel between the agglomerating tube assemblies and the outlet means.

Figure 1:
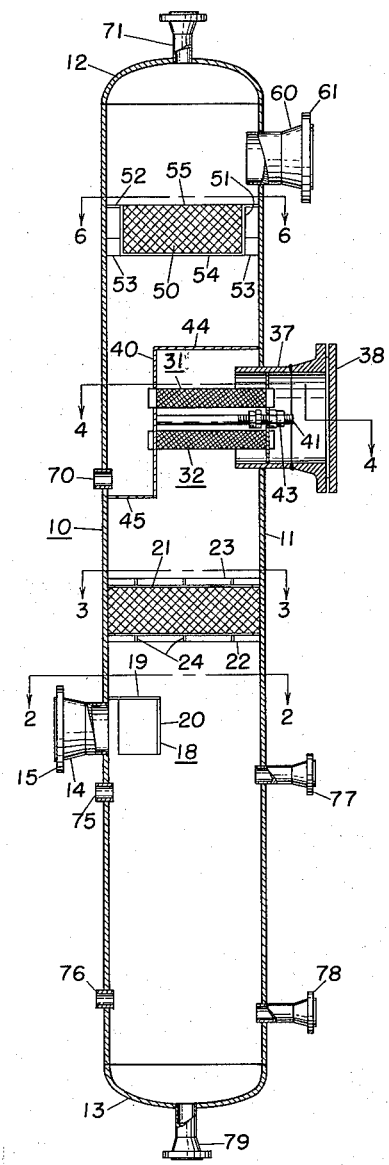
FIG. 1 is a view in section illustrating one embodiment of apparatus constructed in accordance with the invention.

Referring to the drawings, as shown in FIG. 1, the shell 10, which is an enclosed pressure vessel, is formed by an elongated, hollow, cylindrical member 11 to which is secured upper closure member 12 and lower closure member 13. The upper and lower closure members may be secured to member 11 by any satisfactory means, such as welding.

Figure 2:
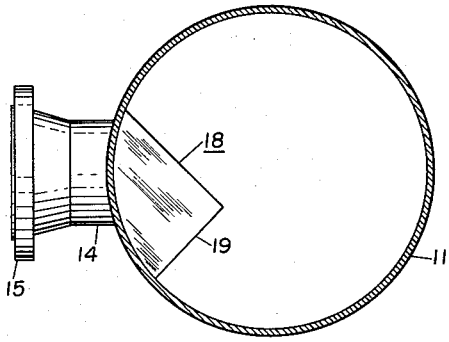
FIG. 2 is an enlarged view in section taken along the line 2—2 in FIG. 1.

Inlet nozzle 14 is secured into member 11 at a location in member 11 sufficiently removed from the lower end of the shell to permit the collection of a substantial quantity of separated liquid in the lower portion of the shell. Flange 15 is secured to inlet nozzle 14 to permit the connection of an inlet line, not shown, to conduct the gas to be processed into the shell. As shown in FIG. 2, a first baffle 18 is provided within the shell adjacent to the inlet nozzle 14. Baffle 18 is formed by top member 19 and side member 20 and is welded to the inside surface of member 11. Side member 20 is positioned at an angle with the axis of nozzle 14 so that incoming gas and mist will impinge upon the member. Baffle 18 acts to receive incoming gas and entrained mist from nozzle 14 and impart to the gas and mist a circular or swirling motion within the shell. In lieu of using baffle 18, a swirling motion may be imparted to the incoming gas and mist by securing nozzle 14 in a position such that it will discharge the gas and mist tangentially into the shell.

Figure 3:
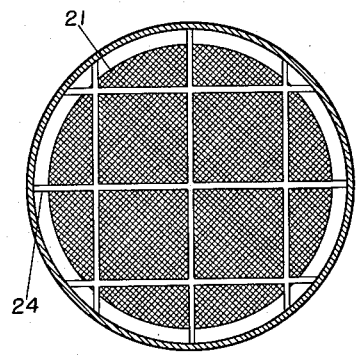
FIG. 3 is an enlarged view in section taken along the line 3—3 in FIG. 1.

Positioned within the shell on the upstream side of or above the inlet nozzle is a first or lower filter unit 21. Filter unit 21 is preferably formed of a knitted or woven wire mesh. Knitted or woven wire mesh filter units are readily available and may be obtained with various types of metals being used, such as stainless steel. Such filter units are manufactured from wire having various diameters and are woven in various manners such that the desired density and surface area may be readily obtained. Filter units of this type are also formed of glass fibers and various types of plastics. The choice of the material from which the filter unit is made and the particular physical characteristics of the filter unit will depend upon the gases and liquids passing through the shell. Filter unit 21 is secured in position by rings 22 and 23 which are welded to the inside surface of member 11. To assist in maintaining the filter unit in position between the rings, a plurality of bars 24 are secured to each of the rings, as shown in FIG. 3, to form grids which contact and support the bottom and the top of the filter unit.

Figure 4:
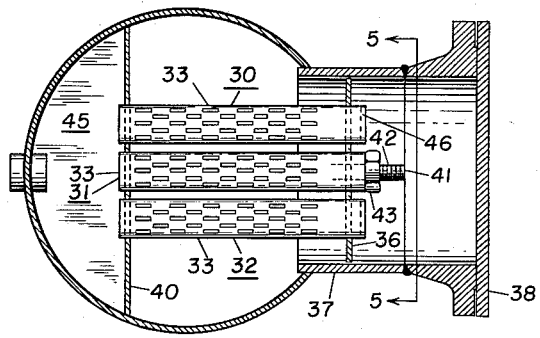
FIG. 4 is an enlarged view in section taken along the line 4—4 in FIG. 1.
Figure 6:
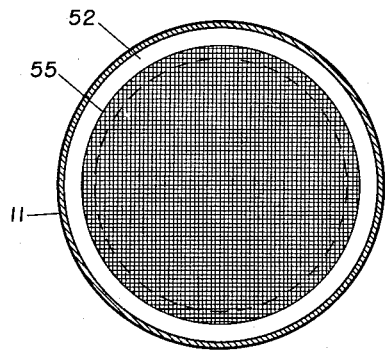
FIG. 6 is an enlarged view in section taken along the line 6—6 in FIG. 1.
Figure 5:
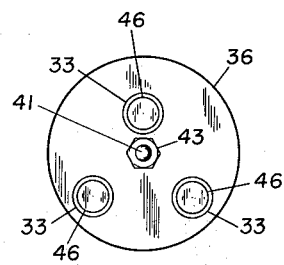
FIG. 5 is a view in section taken along the line 5—5 in FIG. 4 showing only the round supporting plate and ends of the slotted agglomerating tube support members.

Secured within the shell on the upstream side of or above filter unit 21 are a plurality of agglomerating tube assemblies 30, 31, and 32. Each of the agglomerating tube assemblies comprises a slotted cylindrical member 33, glass wool tube 34, and wire sleeve 35. Further details on tube assemblies 30, 31, and 32 are discussed hereinafter. Members 33 are secured to a round plate 36 which fits within manway 37 which is secured through member 11. In the embodiment illustrated, the axes of the tubes are positioned normal to the axis of the shell, though it will be understood that such positioning is not essential to proper operation of the apparatus. Manway 37 is closed by a cover 38. Each of the inward ends of members 33 fits through holes provided in vertically positioned baffle 40 which extends completely across the shell as shown in FIG. 4. The agglomerating tube assemblies thus form an exclusive flow path for gas and mist particles through the baffle. A bolt 41 is secured to baffle 40 and extends from the baffle into manway 37 along the axis of the manway. Bolt 41 is provided with threads 42. The members 33 are held in position by plate 36 which is secured on bolt 41 by nuts 43. The agglomerating tube assemblies and plate 36 form a unit which may readily be removed from the shell through manway 37 by disengagement of nuts 43 from bolt 41. The baffle 40 is secured at its upper end to a horizontal baffle 44 and at its lower end to a horizontal baffle 45. Baffles 44 and 45 are each formed in the shape of a segment of a circle having the same diameter as the inside diameter of member 11 and are secured along their periphery to the inside surface of member 11. The combination of baffles 40, 44, and 45, sometimes referred to collectively as the second baffle, divides the shell into two compartments and thus forms a complete barrier to the flow of gas and liquids through the shell, thus forcing all liquids and gases to pass through the agglomerating tubes.

Figure 7:
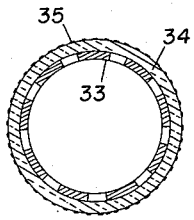
FIG. 7 is an enlarged view in cross section of one agglomerating tube employed in apparatus of the invention.

As shown in FIGS. 4 and 7, each of the agglomerating tube assemblies comprises a slotted cylindrical member 33 which is surrounded by glass wool 34. FIG. 4 shows the cylindrical members 33 with the glass wool removed. The glass wool 34 is in the form of a tube which fits over each member 33 along that portion of each member which extends between baffle 40 and plate 36. Wire sleeve 38 fits snugly around glass wool 34. Each of members 33 is sealed at its outer end, the end fitting in plate 36, by a cap 46 which is welded inside of the member. Each of the members 33 is open at its inward end. With this form of construction, gases and entrained liquids may pass through wire sleeve 35, glass wool tubes 34, and the slots in members 33 into the interior of members 33 and then through their open inward ends to the upstream side of baffle 40.

Secured within the shell above or upstream from baffle 44 is an upper or second filter unit 50 which is mounted in a cylinder 51, secured to a ring 52. Ring 52 is welded or secured in some other satisfactory manner to the inside of member 11. To provide additional support for cylinder 51, a plurality of braces 53 are connected between the outside surface of cylinder 51 and the inside surface of member 11. Filter unit 50 is held in position within cylinder 51 by means of wire mesh grids 54 and 55. Grid 54 is welded to the lower end of cylinder 51. Grid 55, which fits over the upper end of cylinder 51, extends beyond cylinder 51 and is welded to ring 52. Filter unit 50 is formed of knitted or woven wire mesh in the same manner as the lower filter unit 21.

Positioned above filter unit 50 extending through the wall of the shell is an outlet nozzle 60 which is provided with a flange 61 to permit the connection of an outlet conduit to convey gas from the apparatus.

Secured to the member 11 adjacent to and above baffle 45 is a drain connection 70 to permit the withdrawal of liquids which collect above the combination of baffles 40, 44, and 45. Secured into the upper end 12 is a nozzle 71. Nozzle 71 may be used for the connection of a pressure relief valve employed for safety purposes.

Connected through the wall of member 11 below inlet nozzle 14 are gauge glass connections 75 and 76. Any type of gauge glass desired may be secured to these connections to indicate the level of liquid in the lower portion of the shell. Also connected through the wall of member 11 below nozzle 14 are nozzles 77 and 78 to which may be connected liquid level control apparatus for maintaining the separated liquid in the lower portion of the shell at the desired level. Secured through bottom 13 is a drain nozzle 79 through which separated liquids may be drained from the shell. Liquid control apparatus, not shown, connected to nozzles 77 and 78 may be adapted to control the flow of liquids through nozzle 79, thus maintaining constant drainage from the shell.

In the operation of the apparatus, gas and entrained liquid particles are introduced into the shell through inlet nozzle 14. The mixture passes into the shell where it strikes baffle 18 which imparts to the mixture a spinning or swirling action within the shell. As the mixture exits from the baffle, some of the largest particles will drop due to gravity separation to the bottom of the shell, while others will continue with the spinning mixture and centrifugal action will cause some particles to be thrown against the inside surface of the shell along which they will drain to the bottom.

The mixture remaining after the initial gravitational and centrifugal separation passes upwardly through filter unit 21 which causes the remaining larger particles to separate from the mixture and drain to the lower end of the shell. The mixture then continues upwardly in the shell from filter unit 21 at which time it contains particles which were not separable by the wire mesh of filter unit 21. The mixture then flows through agglomerating tube assemblies 30, 31, and 32 and outwardly through the ends of the assemblies to the upstream side of the baffle 40. During flow through the agglomerating tubes, the particles of liquid in the mixture coalesce into larger particles which are of a size which is then separable by the wire mesh in filter unit 50. The flow of the mixture continues upwardly through filter unit 50 at which point the coalesced particles of liquid are removed from the mixture. The gas flowing from filter unit 50 passes outwardly from the vessel through outlet nozzle 60. Those particles which were removed by filter unit 50 drain downwardly along baffles 44, 40, and 45 to drain connection 70 where they are removed from the shell.

A specific example of the construction of a mist extractor according to the particular embodiment of the invention illustrated is as follows: Lower filter unit 21 is formed of wire mesh constructed with corrosive resistant steel wire having a diameter of approximately .006 inch. The wire mesh has a density of approximately 22½ pounds per cubic foot and a wire surface area of approximately 375 square feet per cubic foot of bulk volume. In the agglomerating tube assemblies, the glass wool tubes 34 are formed of fibers having a diameter ranging from approximately 9 microns to 15 microns. The bulk density of the glass wool is approximately 4 pounds per cubic foot. Upper filter unit 50 is formed of the same type of wire as lower unit 21, and the diameter of the wire is approximately .011 inch. The upper filter unit has a bulk density of approximately 15 pounds per cubic foot and a wire surface area of approximately 136 square feet per cubic foot of bulk volume.

Proper sizing of the various components of the mist extractor is necessary in order that the stream of gas and entrained liquid particles will flow at the proper velocity to insure operation of the filter units and the agglomerating means. The rate of flow through the filter units 21 and 50 must be such that the velocity is below flooding velocity. That is, the velocity through these units must be at a rate which will permit liquid particles which are separated by the units to collect and drain freely from the units rather than being blown off and carried along with the gas stream beyond the units. On the other hand, the velocity of the stream of gas and entrained liquid particles through the agglomerating tube assemblies must be sufficient to blow the coalesced particles from the assemblies and carry them with the gas stream so that they will be separated from the stream by the second or upper filter unit.

In the operation of the illustrated embodiment of the invention utilizing filters and agglomerating tube assemblies whose specifications are set out above, the following conditions were found to exist. The gravitational and centrifugal separation which occurred upon introduction of a mixture into the apparatus through inlet nozzle 14 resulted in separation of those particles which ranged in size from approximately 150 microns to 300 microns. Those separated particles drained downwardly in the apparatus and were removed through nozzle 79. The particles in the mixture remaining after the gravitational and centrifugal separation passed upwardly into lower filter unit 21 which caused separation of the particles whose size ranged upwardly from a minimum of approximately 5 microns to 20 microns. The particles separated by the lower filter unit drained downwardly from the filter unit to be removed from the apparatus through nozzle 79. The mixture passing upwardly from lower filter unit 21 contained particles which ranged in size up to 5 microns to 20 microns. The mixture then passed through agglomerating tube assemblies 30, 31, and 32 which caused coalescence of the particles into larger particles which had a minimum size of approximately 20 microns to 150 microns, which was sufficient to enable them to be removed by upper filter unit 50 upon the mixture's passing through the upper filter unit. It is to be noted that the agglomerating tube assemblies function not to separate particles from the mixture but to agglomerate or coalesce small particles in the mixture into larger particles which are of sufficient size to be removable by the wire mesh filter unit 50. Those particles removed by filter unit 50 drain from the unit and downwardly in the apparatus to be removed from it through drain connection 70. The gas leaving the apparatus through outlet nozzle 60 was found to be substantially 99.9 percent to 100 percent free of entrained liquid particles.

We claim:

1. In a mist extractor the combination which comprises a vertically-positioned, cylindrical pressure vessel, an inlet nozzle secured through the wall of said vessel, a first baffle secured within said vessel adjacent to said inlet nozzle, said first baffle comprising a side member positioned at an angle with the axis of said inlet nozzle and a top member positioned above said inlet nozzle, a drain nozzle secured in the lower end of said vessel, a first wire mesh filter unit secured within said vessel above said inlet nozzle and said first baffle, a second baffle secured within said vessel above said first filter unit dividing said vessel into two compartments, said second baffle comprising an upper horizontal member, a middle vertical member, and a lower horizontal member, a plurality of slotted tubular members positioned within said vessel normal to the vertical axis of said vessel, said tubular members being open at their inward ends and closed at their outward ends, the inward ends of said tubular members being secured through said vertical member of said second baffle and extending at their outward ends through the wall of said vessel, a manway opening through the wall of said vessel encompassing said tubular members, plate means positioned in said manway for supporting the outward ends of said tubular members, a cover secured in sealed relationship over said manway, a glass wool tube positioned on each of said tubular members between said plate means and said baffle, a drain connection in the wall of said vessel adjacent to and above said lower member of said second baffle, a second wire mesh filter unit secured within and across said vessel above said second baffle, and an outlet nozzle in said vessel above said second filter unit.

2. In a mist extractor the combination which comprises a pressure vessel, means secured to said pressure vessel including an inlet nozzle for introducing a gas-liquid mixture into said vessel at an angle which will impart centrifugal action to said mixture within said vessel, a first filter unit secured within said vessel downstream from said inlet nozzle, a baffle secured within said vessel downstream from said first filter unit dividing said vessel into two compartments, a plurality of perforated tubular members positioned within said vessel, said tubular members being open at their inward ends and closed at their outward ends, the inward ends of said tubular members extending through said baffle, a manway opening through the wall of said vessel encompassing said tubular members, a cover secured in sealed relationship over said manway, plate means positioned within said manway for supporting the outward ends of said tubular members, an agglomerating tube positioned on each of said tubular members between said plate means and said baffle, a second filter unit positioned within said vessel downstream from said baffle, and an outlet nozzle in said vessel downstream from said second filter unit.

References Cited in the file of this patent

UNITED STATES PATENTS

| | | |
|---|---|---|
| 2,514,623 | Brown | July 11, 1950 |
| 2,521,785 | Goodloe | Sept. 12, 1950 |
| 2,547,769 | Packie | Apr. 3, 1951 |
| 2,661,076 | Walker | Dec. 1, 1953 |
| 2,745,513 | Massey | May 15, 1956 |
| 2,812,034 | McKelvey | Nov. 5, 1957 |

UNITED STATES PATENT OFFICE
CERTIFICATION OF CORRECTION

Patent No. 3,010,537                                    November 28, 1961

Charles Ovid Baker et al.

It is hereby certified that error appears in the above numbered patent requiring correction and that the said Letters Patent should read as corrected below.

Column 3, line 69, for "exists" read -- exits --.

Signed and sealed this 24th day of April 1962.

(SEAL)
Attest:

ESTON G. JOHNSON                                            DAVID L. LADD
Attesting Officer                                                Commissioner of Patents